Patented Oct. 12, 1948

2,451,052

UNITED STATES PATENT OFFICE 2,451,052

METALLO-ORGANIC COMPOSITIONS

Carl N. Andersen, Pleasantville, N. Y., assignor, by mesne assignments, to Gallowhur Chemical Corporation, a corporation of New York No Drawing. Application March 2, 1945, Serial No. 580,703

3 Claims. (Cl. 260—432)

My invention relates to new chemical compositions and to methods of producing and using the same. In particular my invention relates to compositions which consist of or contain metallo-organic compounds which have mercury and an aromatic group combined in the anion of a compound and have another metal as the cation.

Compositions of this character are new and represent a class of materials which possess marked fungicidal and germicidal properties. Certain compounds of this class, such as those which also contain an $NH_2$ group in the anion are further characterized by their substantivity to fabrics and in many instances the latter compositions are also very soluble in water and therefore are ideally suited for use in treating textiles in a one-bath operation to render them resistant to the action of bacteria and fungi. Other compositions of the class, and compositions embodying the present invention, are less soluble in water or are substantially insoluble and are more suitable for use in the form of dry powders or otherwise for disinfecting and fungicidal purposes.

The principal object of my invention is to provide new and useful compositions which consist of or contain metallo-organic compounds having metal in a cation and having an anion containing mercury and an aromatic group.

Another object of my invention is to provide methods for producing and using these new compounds and compositions.

A particular object of my invention is to provide improved compounds or compositions and methods for inhibiting the growth of bacteria and fungi.

A further object of my invention is to provide new water soluble metallo-organic compounds or compositions adapted for use in treating textiles, paper, leather, paints, and other products.

These and other objects and features of my invention will appear from the following description thereof in which reference is made to particular compounds, compositions and procedures for the purpose of indicating the nature of my invention but without intending to limit the scope thereof.

Compositions embodying my invention consist of or contain compounds which are believed to have the general empirical formula:

$$M(RHgX)_n$$

in which M is a metal which lies in the electromotive scale between aluminum and mercury inclusive, and especially copper, zinc, cadmium, cobalt and nickel. Hg represents mercury; R is an aromatic group which may or may not have one or more substituents; X is a salt forming atom or group; and $n$ is a small number, probably an integer between 1 and 10. In some instances it would appear that the active agent in compositions embodying my invention is in reality a mixture of compounds and therefore the term "composition" is herein used in a generic sense to include a compound or a mixture of compounds. I believe, however, that these new compositions comprise at least one compound having the general empirical formula suggested above and will therefore refer to such compounds in describing my invention.

The general formula given is indicated by extensive experiments, particularly with those compounds in which M is copper which give reactions characteristic of cationic copper. The mercury gives a reaction characteristic of an aromatic-mercury group containing complex. Thus solutions containing the new compounds in which M is copper, produce a red precipitate characteristic of copper sulfide when treated with sodium sulfide and do not result in the formation of mercury sulfide. Similarly, when ammonium hydroxide is added to a solution of the copper compound the deep blue color characteristic of cupro-ammonium compounds is produced. On the other hand, when hypophosphorous acid is added to the solution metallic mercury precipitates, which is a characteristic reaction of phenyl mercury compounds and similar aromatic mercury compounds.

The number of aromatic mercury groups in the molecule appears to vary in different compounds but in the case of a salt having the probable formula $$Cu(NH_2C_6H_4HgCl)_n$$

it would appear that $n$ is 8, in view of the fact that the compound contains 63% by weight of mercury and only about 3% by weight of copper. In other compounds the value of $n$ is believed to vary from 1 to 10 insofar as it has been possible to purify and analyze particular compounds.

In producing compositions or compounds embodying my invention it is generally preferable to add a salt of the metal which is to form the cation of the new compound to a solution containing a composition embodying the complex which is to form the anion of the new compound. It would appear that any soluble salt of a metal between aluminum and mercury inclusive in the electromotive series and particularly copper, zinc, cadmium, cobalt or nickel may be used for this purpose. Thus, for example, I may employ copper acetate, zinc acetate, cadmium acetate, cobalt acetate, nickel acetate, copper sulfate, copper nitrate, copper chlorate, sodium zincate and numerous other salts of the metals mentioned.

Any of the metal salts mentioned above in either solid form or in solution may be added directly to solutions of aromatic mercury compounds such as phenyl mercury lactate, phenyl mercury acetate, para-amino phenyl mercury lactate, para-amino phenyl mercury acetate, hydroxy phenyl mercury acetate, mono or dichlor aniline mercury lactate, ortho-toluidine and xylidene mercury lactates and acetates and naphthyl mercury lactate, for example. However, it is frequently preferable in forming compounds and compositions embodying my invention to prepare the organic mercury compound as an incident to the formation of the new compound itself.

By way of example the following procedures are cited as typical of the methods in which molar quantities of the reactants are employed in the practice of my invention:

*Example I*

216 grams of mercuric oxide is moistened with 50 grams of water, and to this paste is added 400 grams of 80% lactic acid. By agitation the material readily dissolves without the application of heat. When this solution is complete, an equal amount of water (400 grams) is added to the solution and the mixture treated with 93 grams of aniline. The mixture is agitated until the first appearance of crystals on the side of the beaker. 1,140 grams of 80% lactic acid is added and 1,505 grams of water. The mixture is stirred; and when a uniform solution results from 100 to 200 grams of solid copper acetate salt are added. On agitation the copper acetate readily dissolves and the odor of acetic acid becomes pronounced. 20 grams of Igepal CA Extra (a polyether alcohol condensate) is added as a dispersing or wetting agent, which at the same time prevents the precipitation of any insoluble material resulting from the hardness of the water which might be used in the commercial application of the material. Any non-ionic dispersing agent may be used, but this ingredient is optional.

The solution of mercuric oxide in the lactic acid in the foregoing process presumably results in the formation of mercuric lactate whereas the addition of aniline to the solution is believed to give rise to an addition compound which undergoes molecular rearranging to produce a compound in which mercury is directly attached to carbon in the benzene ring in the para position with respect to the nitrogen—thereby forming para-amino phenyl mercury lactate within the solution.

The addition of copper acetate to this solution, in turn, results in the formation of the new compound as evidenced by the liberation of acetic acid which results upon mixing the solutions and the further evolution of acetic acid vapors on concentrating the resulting composition. The solution is dark green in color and has a pH value of about 3. It is miscible in all proportions with water, alcohol and glycerine and is immiscible with benzene and Stoddard solvent. In carrying out the process described all of the reactions take place readily at room temperature.

The resulting compound is believed to have the formula

$Cu(NH_2C_6H_4HgOOCHCOHCH_3)_n$ but has not been isolated in a pure form since it is mixed with free lactic acid and other compounds which are by-products of the reaction and from which the new compound is not readily separated. However, solutions of the salt may be concentrated at 104° C. without decomposition and a heavy crystal-containing product of a dark green color is obtained. This product is readily soluble in water and the resulting solutions are miscible in all proportions with water, alcohol and glycerine but are immiscible with benzene and Stoddard solvent. The solution is strongly fungicidal and ideally suited for treatment of fabrics, paper, leather and other materials in a one-bath operation. This product also is substantive to cloth as indicated by leach tests. Experiments indicate further that this composition is no more toxic than solutions of calomel having an equal mercury content and neither the solutions nor the solid product obtained by evaporation of the solution produced any irritation of the skin. It is therefore safe, easy and effective for use in treating fabrics and the like and for many other purposes wherein it is desired to inhibit the growth of bacteria or fungi by the use of baths or liquids.

*Example II*

Upon addition of sodium chloride to the solution obtained in the process set forth above the insoluble chloride compound previously referred to is produced. This compound is a brown crystalline powder having a melting point of 238° C. and substantially insoluble in water. It is strongly fungicidal and is adapted for use in dusting or treating materials or surfaces to inhibit the growth of bacteria and fungi.

*Example III*

When copper sulphate is substituted for copper acetate in Example I or when dilute sulfuric acid is added to the solution obtained in Example I a dark green product is produced which is only slightly soluble in water and is presumed to have the general formula

$Cu(NH_2C_6H_4HgSO_4)_n$

*Example IV*

134 grams of phenyl mercury acetate are dissolved in 2 liters of water by heating the solution to boiling. The solution is filtered and to the filtrate 80 grams of copper acetate are added and the mixture is agitated and heated for 10 minutes. Upon cooling a bluish green precipitate results on standing overnight. This product is washed thoroughly with water and extracted with carbitol to remove any excess phenyl mercury acetate remaining in the product. After repeated washing with fresh carbitol the product is washed with ethyl alcohol and is found to have a melting point between 255° and 260° C. The proportions of the phenyl mercury acetate and copper acetate used in this example are in the ratio of 1 to 1 molar quantities.

Instead of adding solid copper acetate to an aqueous solution of phenyl mercury acetate it is found that crystalline phenyl mercury acetate may be added to a boiling solution of copper acetate. Further, the copper acetate and phenyl mercury acetate may be separately dissolved in water and the solutions mixed to produce the product described above.

Example V 19.9 grams of copper acetate are dissolved in 200 cc. of water and the solution is heated to boiling at which time 29.4 grams of phenyl mercury hydroxide are added to the solution. The mixture is heated and agitated for 15 minutes until all of the phenyl mercury hydroxide has gone into solution and a bluish green precipitate settles to the bottom of the flask. The mixture is allowed to stand overnight and thoroughly washed with water. It is then extracted with boiling carbitol and finally washed with alcohol and dried. The melting point of this product is about 256° C.

Example VI

The method of Example I may be used in producing other compositions or compounds in accordance with my invention and by way of illustration 108 grams of o-toluidine may be substituted for the aniline in Example I. Similarly, 127 grams of monochloraniline may be employed in place of the aniline in Example I. Other organic compounds also may be used to replace the aniline and among these may be mentioned phenols, cresols, xylenols, anisidine, xylidine, dichloraniline, diphenylamine and other substituted and unsubstituted mono and polycyclic aromatic compounds.

Other organic acids may be substituted for the lactic acid used in the process in Example I. Typical of these acids are glycollic, benozic, salicylic, and in particular, acetic acid may be used.

It is also possible to produce compositions embodying my invention in non-aqueous solutions as represented by the following example.

Example VII 216 grams of mercuric oxide are mixed with 1540 grams of linoleic acid. The solution of the mercuric oxide with the linoleic acid is effected in the presence of a small amount of benzol. To this solution is added 73 grams of aniline and when solution is complete 176 grams of copper acetate together with sufficient benzol to make a total of 4000 grams are added. The mixture has the odor of acetic acid and can be carefully evaporated after the reaction is complete to eliminate the benzol and acetic acid leaving a residue which is soluble in benzol and other organic solvents. This product has strong fungicidal properties and may be added to paints or otherwise used for inhibiting the growth of bacteria and fungi.

Oleic acid and stearic acid and other non-aqueous solvents may be substituted in carrying out the process of Example VII.

In general when it is desired to produce a water soluble fungicidal agent I use lactic acid in the process. Those compounds in which X of the probable general formula is an acetic acid or sulphuric acid group are less soluble in water and when X is chlorine the compounds are substantially insoluble in water. I have also found that when the cation is copper the fungicidal action of the product is most pronounced. Further when the anion of the compound contains an $NH_2$ group it is substantive to fabrics and the extent of loss when subjected to prolonged leaching treatment is less than other compounds proposed heretofore for rendering fabrics resistant to fungi.

A typical method for treating fabrics with water soluble compositions embodying my invention is as follows:

A textile treating bath is made up and the composition produced as described in Example I is added to the bath in amount sufficient to provide 2 to 3% of the compound in the bath. The fabric is passed through the bath and thereafter squeezed to afford 50% pick-up—that is, an increase in weight of 50%. The fabric carrying this amount of the bath is then dried and is ready for use. 5 ounce cotton duck so treated has been subjected to leaching tests by spraying water at room temperature onto the fabric at the rate of 2 liters of water per 8 square inches of cloth per minute. The loss of mercury in the cloth after 8 hours of continuous leaching of various samples so treated varied from 20 to 32% showing remarkable retention of the germicidal agent. Analysis of the cloth showed that whereas it initially contained 1.18% by weight of mercury it contained 0.82% of mercury after 8 hours of continuous leaching.

Tests were conducted to determine the effectiveness of the composition in inhibiting the growth of fungi on the cotton treated cotton duck which had been subjected to leaching for 3 hours as described above. The method used in these tests is that known as Department of Agriculture Procedure 198. The leached products passed this test when using *Chaetomium globosum*, *Aspergillus niger* and Penicillium #1336.2.

Further, when the treated cotton duck was subjected to soil burial tests using the method prescribed by the Jeffersonville Quartermaster Depot it was found to possess the necessary tensile strength required for passage after 14 days of burial.

In connection with the latter tests it is believed that the copper or other metal forming the cation of the new compound probably serves as a buffer to protect the mercury of the anion from the action of sulfur in the soil by combining with the sulfur and thereby leaving the aromatic mercury group intact.

The products obtained when using varying amounts of copper acetate or other soluble salts in the preparation of my new compositions indicate that they may not be pure chemical compounds but may be solutions or mixtures wherein there probably are some unreacted aromatic mercury salts, some excess organic acid and it may be that various new compounds are present in which the metal cation is combined with different numbers of complex aromatic mercury salt forming ions. It is therefore evident that products and methods embodying my invention may vary widely in composition and character.

For this reason I do not wish to restrict my invention to any specific theory or formula for the new chemical compounds or compositions consisting of or containing such compounds. Accordingly it should be understood that the composition and methods of producing and using the same as herein specifically set forth are intended to be illustrative only and are not intended to limit the scope of my invention as defined by the following claims.

I claim:

1. A method of preparing a metallo-organic composition which comprises adding copper acetate to a solution containing para-amino phenylmercury lactate and lactic acid.

2. A method of preparing a metallo-organic composition which comprises adding copper acetate to a solution containing para-aminophenyl mercury lactate and lactic acid, and then adding sodium chloride.

3. As a new composition of matter, the product that is formed by adding copper acetate to a solution containing para-amino phenyl mercury lactate and lactic acid.

CARL N. ANDERSEN.

REFERENCES CITED

The following references are of record in the file of this patent:

UNITED STATES PATENTS

| Number | Name | Date |
|---|---|---|
| 1,087,144 | Schoeller et al. | Feb. 17, 1914 |
| 2,188,746 | Bersworth | Jan. 20, 1940 |

FOREIGN PATENTS

| Number | Country | Date |
|---|---|---|
| 12,472 | Great Britain | May 20, 1909 |
| 255,030 | Germany | Dec. 23, 1912 |

OTHER REFERENCES

Berichte, vol. 28 (1895), page 592, Michaelis.

J. Prak. Chemie, vol. 81 (2), (1910), pages 151 and 154, Reitzenstein et al.